US012124607B2

(12) United States Patent
Kotsogiannis Teftsoglou et al.

(10) Patent No.: US 12,124,607 B2
(45) Date of Patent: Oct. 22, 2024

(54) SAFEGUARDING LOCATION VISITATION INFORMATION

(71) Applicant: Snap Inc., Santa Monica, CA (US)

(72) Inventors: Ioannis Kotsogiannis Teftsoglou, Santa Monica, CA (US); Mohammad Zaheri Darkahi, Washington, DC (US)

(73) Assignee: Snap Inc., Santa Monica, CA (US)

( * ) Notice: Subject to any disclaimer, the term of this patent is extended or adjusted under 35 U.S.C. 154(b) by 380 days.

(21) Appl. No.: 17/644,297

(22) Filed: Dec. 14, 2021

(65) Prior Publication Data

US 2023/0118306 A1     Apr. 20, 2023

(30) Foreign Application Priority Data

Oct. 20, 2021 (GR) ............................. 20210100717

(51) Int. Cl.
*G06F 21/62*     (2013.01)
*G06Q 50/00*     (2012.01)

(52) U.S. Cl.
CPC ......... *G06F 21/6245* (2013.01); *G06Q 50/01* (2013.01)

(58) Field of Classification Search
None
See application file for complete search history.

(56) References Cited

U.S. PATENT DOCUMENTS

| 2008/0248815 A1* | 10/2008 | Busch | H04L 67/52 455/456.5 |
| 2012/0042392 A1* | 2/2012 | Wu | G06Q 50/01 726/28 |
| 2012/0047129 A1* | 2/2012 | Redstone | G06Q 10/10 707/723 |
| 2016/0170996 A1* | 6/2016 | Frank | G06F 16/904 707/748 |
| 2016/0224803 A1* | 8/2016 | Frank | G06F 21/6245 |

* cited by examiner

*Primary Examiner* — William J. Goodchild
(74) *Attorney, Agent, or Firm* — Schwegman Lundberg & Woessner, P.A.

(57) ABSTRACT

Various embodiments safeguard location visitation information, such as visitation counter information, for a location or place that can be visited by one or more users of a user-based system. According to various embodiments, one or more of the techniques or mechanisms described herein can be used to safeguard user visitation information on a user-based platform: a user's allow list (or block list) that indicates which location visitation information for the user can be shown to another user on the platform; using a visitation category, such as a label, in place of a visitation count when displaying information with respect to a location; using a count of users on a user's connected-users list to determine how visitation count information for a location will be presented or displayed to the user; or adding a certain level of noise to location visitation information that is presented to a user.

20 Claims, 10 Drawing Sheets

SAFEGUARDING LOCATION VISITATION INFORMATION

CROSS-REFERENCE TO RELATED APPLICATION

This application claims the benefit of priority to Greece Application Serial No. 20210100717, filed on Oct. 20, 2021, which is incorporated herein by reference in its entirety.

BACKGROUND

The popularity of social platforms (e.g., such as social networking or social media platforms), which facilitate sharing media content, sharing information regarding events or places/locations, instant messaging, and the like, continues to grow. For example, social platform users are increasingly posting comments and media content items relating to events or places (e.g., images or 'selfies' captured at a place they have visited) in order to share their thoughts or experiences with others on a social platform. As a feature, certain social platforms provide a map that presents different locations/places (e.g., coffee shops, restaurants, music venues, and other business establishments) where, for example, other social platform users (e.g., user's friends on the social platform that enable location sharing) are currently located or for which one or more users have posted media content items (e.g., images with associated with a tag/filter relating to a location/place). For each location/place, the displayed map can present a graphical element (e.g., a graphical card) that provides relevant information in connection with a location/place, where the information can include a physical address, a website address, a phone number, user ratings, user comments, an identification that the location/place is popular amongst social platform users, and the like. Other information provided by the graphical element can include a visitation counter for the location/place, where the visitation counter shows a user how many of the user's friends on the social platform have visited a given location/place. Unfortunately, this type of visitation counter, while seemingly innocuous, can directly or indirectly leak the location data of users (e.g., indicate whether a user's friend has visited a given location/place) or leak user visitation habits (e.g., number of times a user's friend has visited a given location/place). Such data leakage can be become problematic from the perspective of a user's privacy or data privacy.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
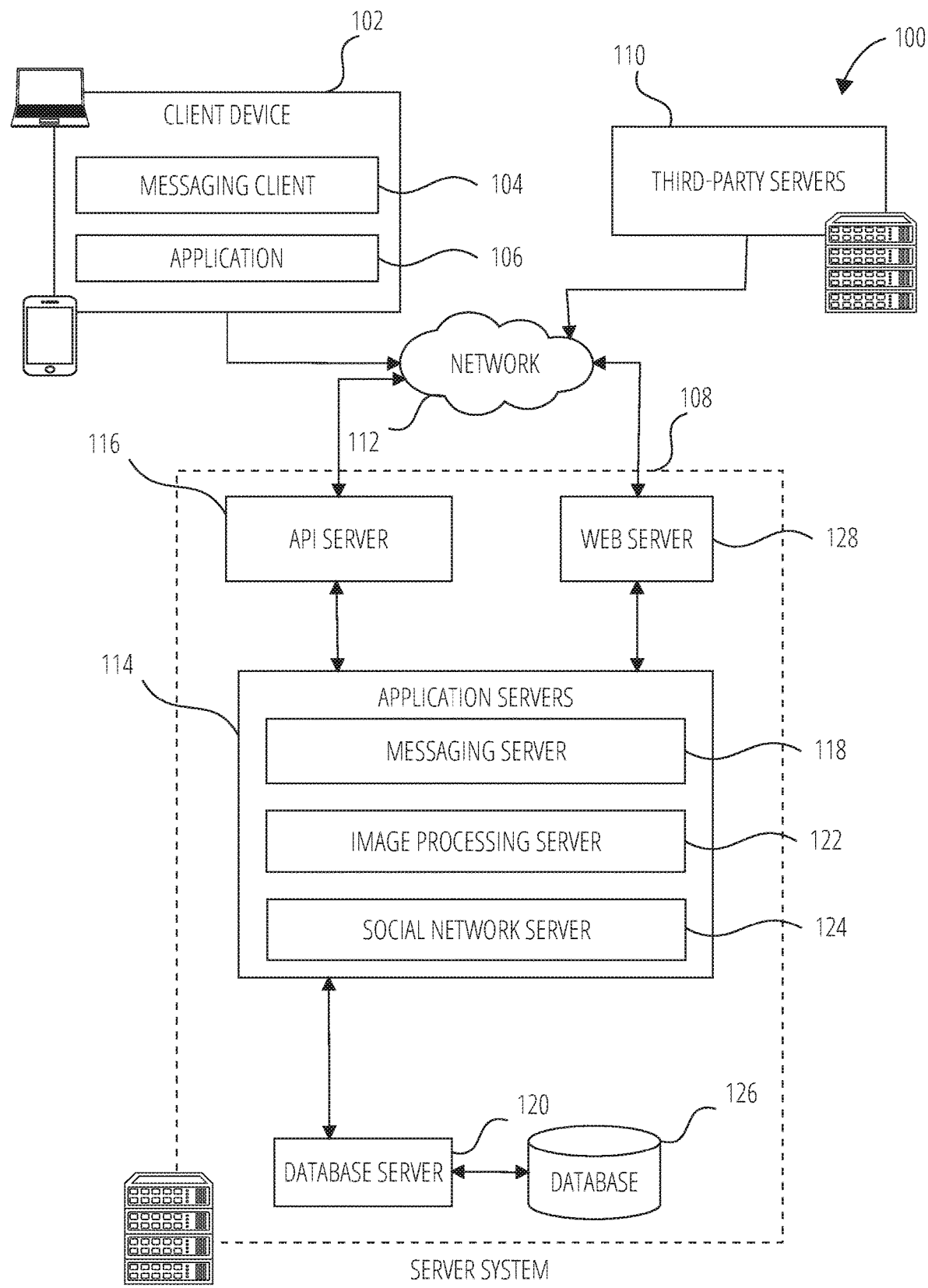
FIG. 1 is a diagrammatic representation of a networked environment in which the present disclosure may be deployed, in accordance with various embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, various embodiments of the present disclosure safeguard location visitation information, such as visitation counter information, for a location (or place) that can be visited (e.g., checked-in) by one or more users of a user-based system, such as a social platform (e.g., social networking or social media platform). For example, various embodiments described herein can provide a user on a social platform plausible deniability with respect to their visitation of a given location or place. Thus, example embodiments prevent leaking a user's private information, such as location data or visitation habits, to another user on the platform. According to various embodiments, one or more of the following techniques or mechanisms can be used to safeguard (e.g., by obscuring or rendering indistinguishable) user visitation information on a user-based platform: a user's allow list (or block list) that indicates which location visitation information for the user can be shown to another user on the platform; using a visitation category, such as a label, in place of a visitation count when displaying information (e.g., in a location information card) with respect to a location; using a count of users on a user's connected-users list (e.g., user's friend list) to determine how visitation count information for a location will be presented or displayed to the user; or adding a certain level of noise to location visitation information that is presented to a user.

As used herein, a location or a place can comprise any location or place (such as a business establishment, a venue, an educational facility, a place of worship, a historical location, or the like), in the real world or a virtual world, that can be visited by a user of a user-based system. A user's visitation of a location or place can be recorded or captured by a social platform in various ways. For instance, a user can register their visit of, or checking in at, the location or place on the user-based platform. A user can select to auto register, or auto check-in, to a location or place based on a location tracking or monitoring (e.g., using global positioning system (GPS) information) performed by the user's mobile client device. Additionally, a user can generate a post while they are physically present at the location or place, or post content relating to the location or place. For example, the user can generate a post tagged with the location or place, or post a media content item relating to the location or place. A user-based system can include a social media system (or platform) or a social networking system (or platform). On such a user-based platform, a first user can be connected to a second user such that the second user is regarded as a connected user, friend user, or friend of the first user, and vice versa.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example system 100 in which the present disclosure may be deployed, in accordance with various embodiments. The system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the server system 108 via the network 112. The data exchanged between messaging clients 104, and between a messaging client 104 and the server system 108, includes functions (e.g., commands to invoke functions) as well as payload data (e.g., text, audio, video or other multimedia data).

The server system 108 provides server-side functionality via the network 112 to a particular messaging client 104. While certain functions of the system 100 are described herein as being performed by either a messaging client 104 or by the server system 108, the location of certain functionality either within the messaging client 104 or the server system 108 may be a design choice. For example, it may be technically preferable to initially deploy certain technology and functionality within the server system 108 but to later migrate this technology and functionality to the messaging client 104 where a client device 102 has sufficient processing capacity.

The server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the system 100 are invoked and controlled through functions available via user interfaces of the messaging client 104.

Turning now specifically to the server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
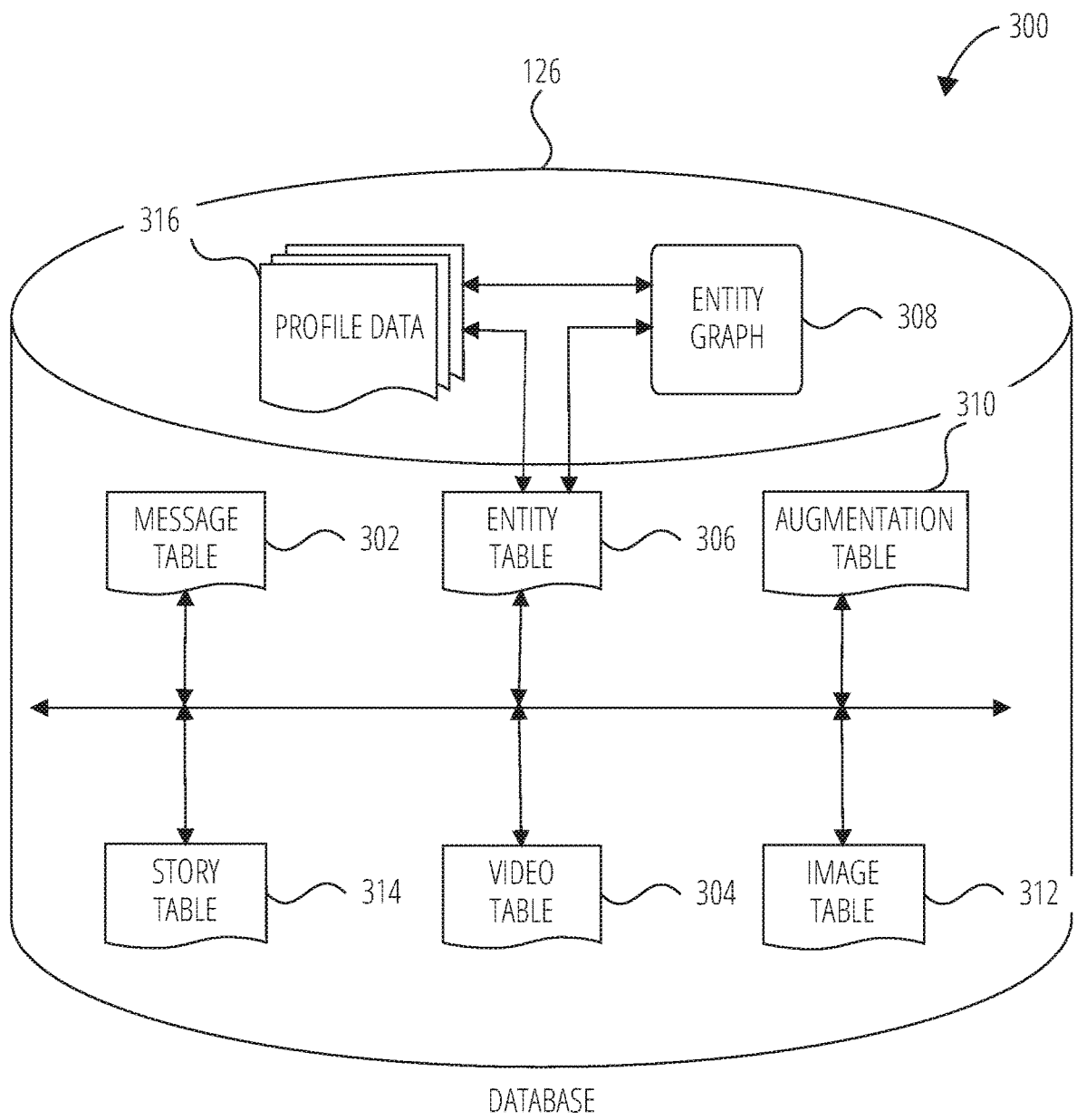
FIG. 3 is a diagrammatic representation of a data structure as maintained in a database, in accordance with various embodiments.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

Figure 2:
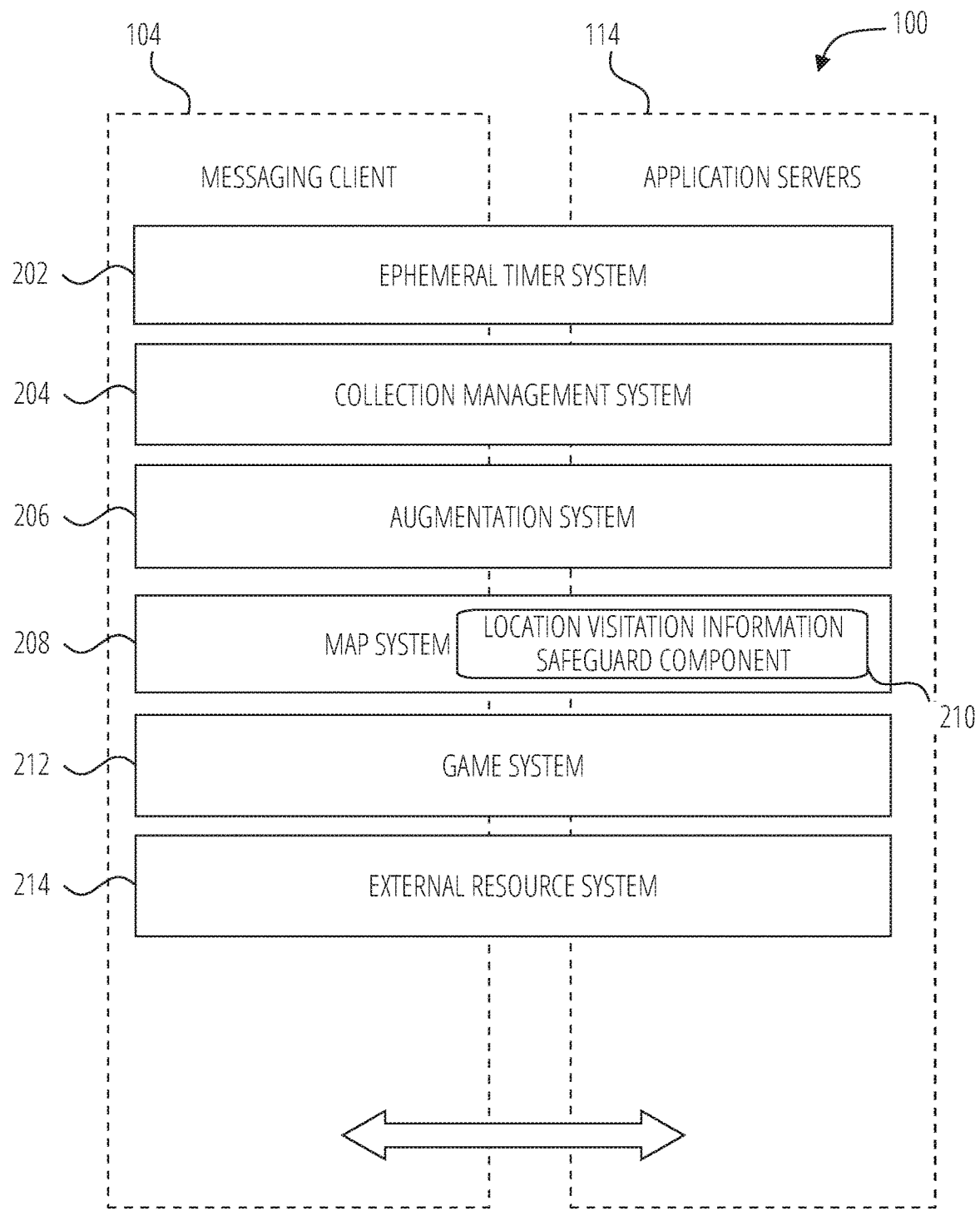
FIG. 2 is a diagrammatic representation of a messaging system, in accordance with various embodiments, that has both client-side and server-side functionality.

FIG. 2 is a block diagram illustrating further details regarding the system 100, in accordance with various embodiments. Specifically, the system 100 is shown to comprise the messaging client 104 and the application servers 114. The system 100 embodies a number of subsystems, which are supported on the client-side by the messaging client 104 and on the sever-side by the application servers 114. These subsystems include, for example, an ephemeral timer system 202, a collection management system 204, an augmentation system 206, a map system 208, a game system 212, and an external resource system 214. As shown, the map system 208 includes a location visitation information safeguard component 210, which implements various embodiments described herein.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a location visitation information safeguard component 210 that allows a collection manager to manage and curate a particular collection of content. For example, the location visitation information safeguard component 210 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message.

For example, the augmentation system 206 provides functions related to the generation and publishing of media overlays for messages processed by the system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 316) on a map to indicate a current or past location of "friends" of a user. The map system 208 further enables display of media content or collections of messages including photographs and videos generated by such friends, within the context of a map. For example, a message posted by a user to the system 100 from a specific geographic location may be displayed within the context of a map at that particular location to "friends" of a specific user on a map interface of the messaging client 104. A user can furthermore share his or her location and status information, such as by using an appropriate status avatar, with other users of the system 100 via the messaging client 104, and this location and status information can be similarly displayed, within the context of a map interface of the messaging client 104, to selected users.

The map system 208, via the location visitation information safeguard component 210, can add a certain level of noise to location visitation information that is presented to a user on the client device 102 with respect to a particular physical location. For instance, with respect to a specific user and other users (e.g., friends) connected to the specific user, the map system 208 can add a noise value (e.g., such as a negative noise value) to a count of connected users (e.g., friends) that visited (e.g., checked-in) to a specific physical location or place. Depending on the embodiment, the map system 208 can determine the noise value by sampling a distribution, such as a Laplace distribution. By adding the noise value to the count, the map system 208 can add a level of indistinguishability or obscurity to a visitation count of the specific physical location when presented to the single user, thereby safeguarding the connected users' location visitation information from privacy leaks to the specific user.

According to some embodiments, the map system 208 uses a distribution, such as a Laplace distribution, to draw a noisy value e. If e is a positive number, then the map system 208 can multiply e by −1 to get a negative noise value. The map system 208 can add e to a count of user's connected-user (e.g., user's friends) that have visited a physical location. Additionally, the sampling of the noise value e from a distribution can be based on a factor s, where s can represent a value for scaling the noise value e. For example, using a Laplace distribution function, Lap(0, s) returns a noise value e scaled by s. The value for scaling is a scale value that can be used as a parameter (e.g., privacy parameter) for adjusting or fine tuning a noise value.

The map system 208, via the location visitation information safeguard component 210, can use a user's allow list or block list that indicates (e.g., by location type) which location visitation information for the user can be shown to another user on the platform. For instance, the map system 208 can use a user's allow list to describe or identify one or more physical locations or types of physical locations for which the user's visitation information is allowed to be shared with another user (e.g., a user's friend), or a user's block list to describe or identify one or more physical locations or types of physical locations for which the user's visitation information (e.g., whether they visited a physical location or not) will not be allowed to be shared with another user. For example, the user's allow list or block list can indicate whether the user's visitation information is to be considered in another user's friend check-in count for a physical location.

A user's allow list or block list can be tailored. For example, a user's block list identifies certain types or categories of physical locations or places, such as marijuana dispensaries, as being blocked for sharing the user's location visitation information. The allow list or block list can represent a user's direct consent or lack of consent with respect to sharing the user's location visitation information.

The map system 208, via the location visitation information safeguard component 210, can use a visitation (e.g., count) category, such as a label, in place of a visitation count when displaying information (e.g., in a location information card) with respect to a physical location. In doing so, when presenting a count of connected users (e.g., user's friends) that have visited a physical location, the social network server 124 can provide less granular count information than the actual count. For example, in place of providing an actual count of a user's connected-users (e.g., user's friends) that visited a physical location (e.g., "4 visitations"), the social network server 124 can use a label of "3+ visitations." Examples of labels can include: "3+ visitations," "5+ visitations," "10+ visitations," and the like; or "Highly Popular," "Mildly Popular," "Lightly Popular," and the like. Each category that is used in place of an exact count can be associated with a range of values. In one example, the range of values are mutually exclusive ranges. For instance, the categories can include: 3+, which is associated with a visitation count range of 3 to 5; 5+, which is associated with a visitation count range of 5 to 10; 10+, which is associated with a visitation count range of 10 to 15; 15+, which is associated with a visitation count range of 15 to 25; and 25+, which is associated with any visitation count above 26. Accordingly, for instance instead of showing "4 visitations," the map system 208 can use the label "3+ visitations."

The map system 208, via the location visitation information safeguard component 210, can use a count of users on (e.g., size value of) a user's connected-users list (e.g., user's friend list) to determine how visitation count information for a physical location will be presented or displayed to the user. For instance, in order for the map system 208 to provide (e.g., display or show) a user with location visitation information for a physical location, the map system 208 can determine that the user has at least a count of users on a user's connected-users list that exceeds a threshold value. Whether the count of users on a user's connected-users list exceeds a threshold value can be determined by adding a predetermined factor k to a visitation count of the physical location (e.g., <friend check-in count> to the physical location). The predetermined k (e.g., 2 or 3) can represent a parameter for tuning or randomizing the threshold value. In particular, the map system 208 can display to an active user, the friend check-in count <FCC> for a physical location (e.g., coffee shop) when, the active user has at least <FCC>+k number of friends in his friend list. For some embodiments, a location visitation information (e.g., connected-user visitation count) for a physical location can be provided to a user if a comparison value, calculated by adding a predetermined factor (k) to the connected-user visitation count for the physical location, is less than or equal to the size of the user's connected-users list. For instance, where X is the size of the user's friend list, the friend check-in count FCC of a physical location is shown to the user if <FCC>+k≤X, where k is some small value (e.g., 2 or 3). For example, where k=2, if a user has only 6 friends on their friend list, 5 of which visited a particular physical location, the map system 208 can prevent the display of the label "5+ visitations" with respect to the particular physical location because (5+2) is less than 6. However, where k=2 and a user has only 6 friends on their friend list, the map system 208 can cause the label "3+ visitations" to display with respect to another physical location where 3 of the user's friends have visited, because (3+2)≤6. For some embodiments, different predetermined factors k can be used for different contexts, such as different geographic regions. In this way, some embodiments can use different threshold values for comparison against a size of a user's connected-user list for different contexts (e.g., different geographic regions).

For various embodiments, different combinations of techniques and mechanisms described herein can be used in different orders to safeguard location visitation information by rendering the information indistinguishable or obscure. For example, via the location visitation information safeguard component 210, the map system 208 can: generate a modified count for a specific physical location (e.g., a specific restaurant) by adding a negative noise value to the count (e.g., friend check-in count) of connected-users (e.g., friends) that have visited (e.g., checked-in at) the specific physical location. The map system 208 can determine or identify a category that applies to the modified count and can then use a label (e.g., "3+ visitations" or "middle") associated with the category in place of the modified count. For example, the label within location visitation information can be provided or displayed to a user viewing information regarding the specific physical location.

The game system 212 provides various gaming functions within the context of the messaging client 104. The messaging client 104 provides a game interface providing a list of available games that can be launched by a user within the context of the messaging client 104, and played with other users of the system 100. The system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, i.e., applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

FIG. 3 is a schematic diagram illustrating data structures 300, which may be stored in the database 126 of the server system 108, in accordance with various embodiments. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the system 100, based on privacy settings specified by a particular entity. Where the entity is an individual, the profile data 316 includes, for example, a username, telephone number, address, settings (e.g., notification and privacy settings), as well as a user-selected avatar representation (or collection of such avatar representations). A particular user may then selectively include one or more of these avatar representations within the content of messages communicated via the system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

For some embodiments, the database 126 of FIG. 1 stores location visitation information regarding physical locations (or places) and particular users, such as visitation information identifying which users have visited each physical location. Additionally, as noted, the entity graph 308 can store information regarding relationships and associations between entities, such as connections (e.g., friendships) between users. Accordingly, the entity graph 308 can provide information for determining or identifying a list of connected-users for a single user. As described herein, the list of connected-users for the single user can be used in determining a count of visits for a particular physical location by connected-users of the single user.

Figure 4:
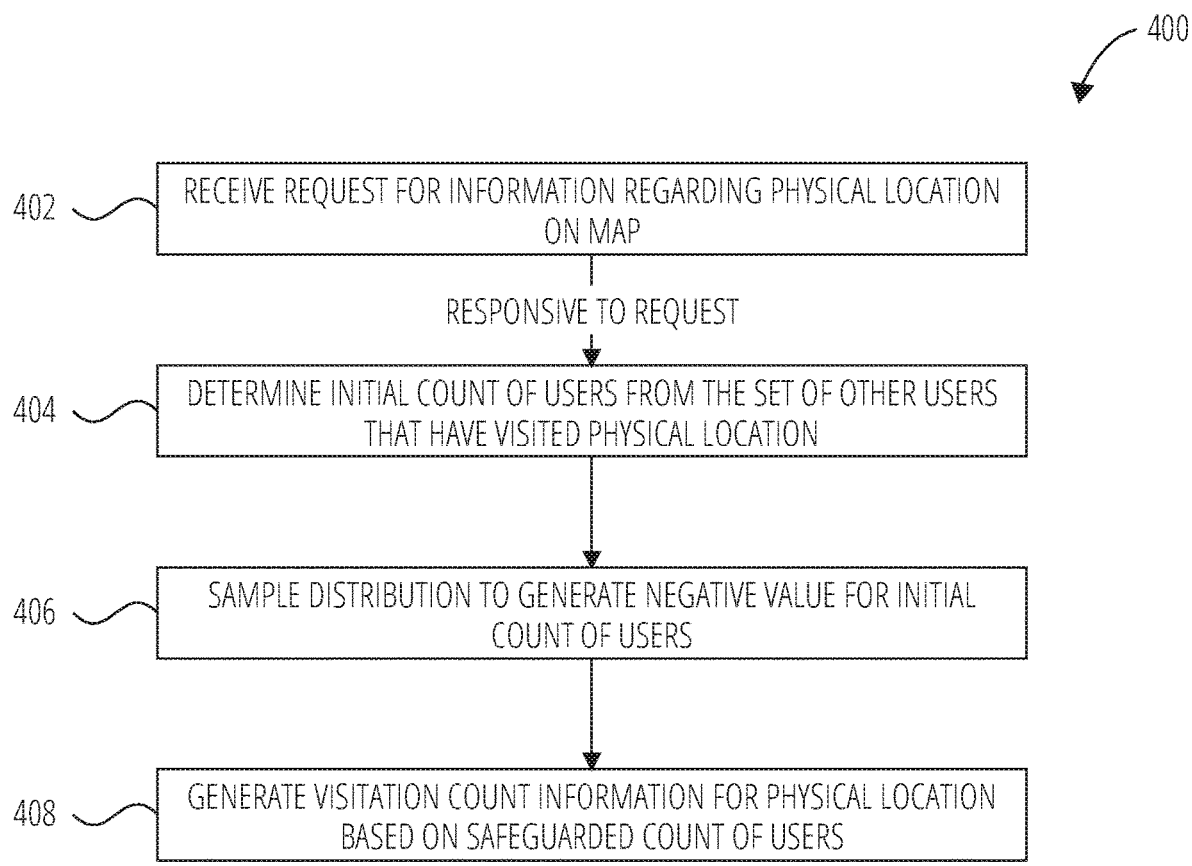
FIGS. 4 through 6 are flowcharts illustrating example methods for safeguarding location visitation information, in accordance with various embodiments.
Figure 5:
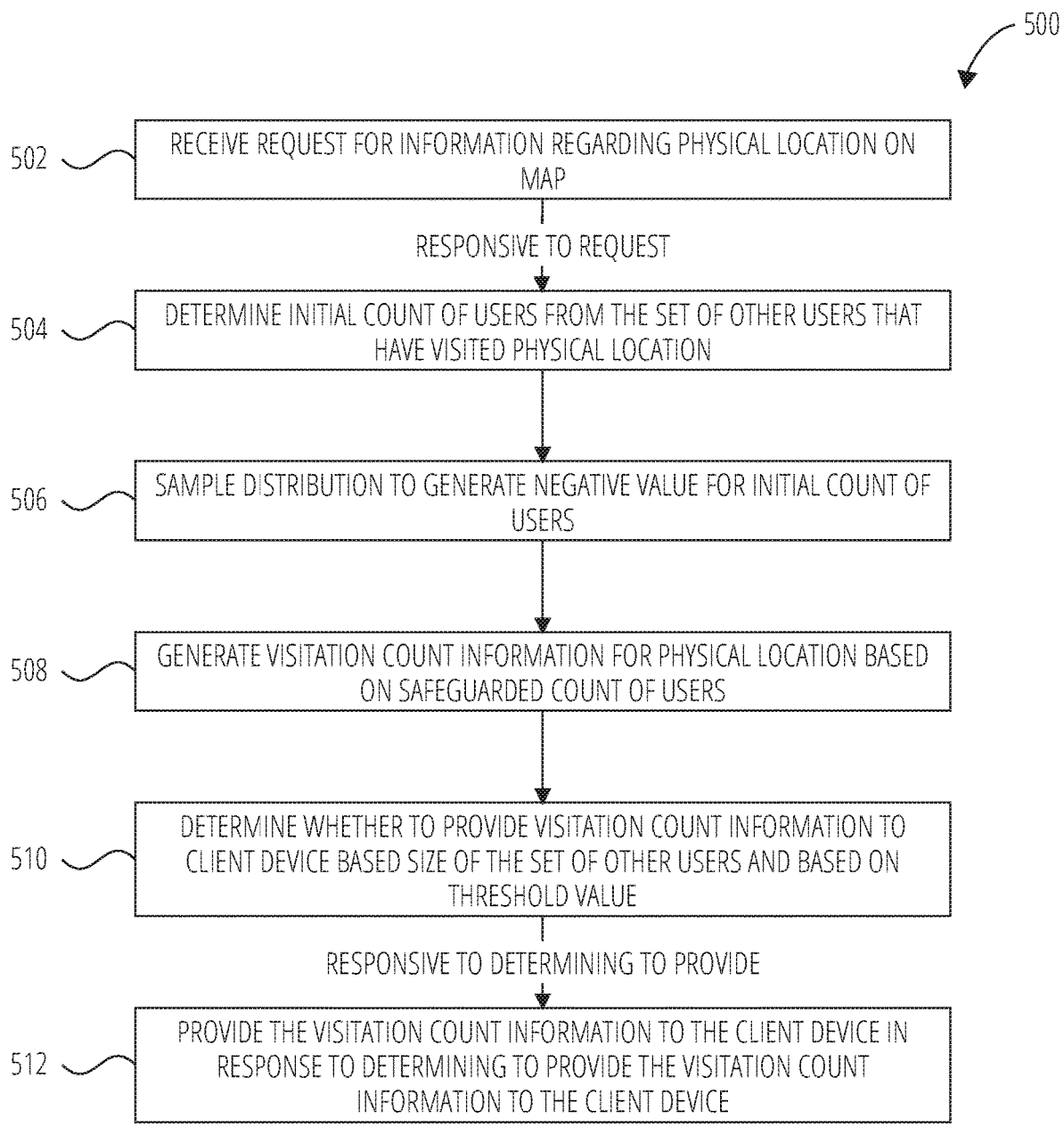
Figure 6:
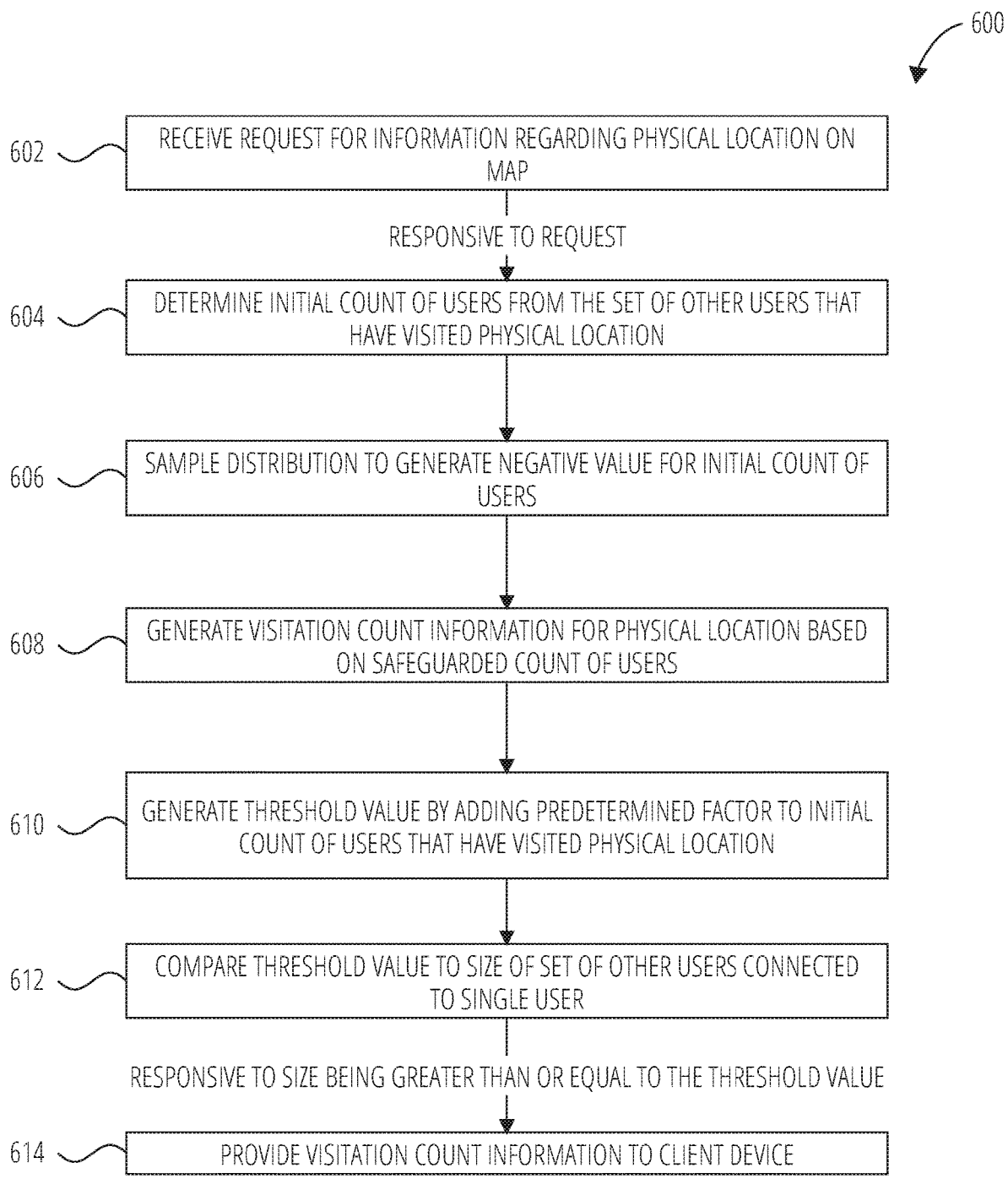

FIGS. 4 through 6 are flowcharts illustrating example methods for safeguarding location visitation information, in accordance with various embodiments. Various methods described herein with respect to FIGS. 4 through 6 may be embodied in machine-readable instructions for execution by one or more computer processors such that the operations of the methods may be performed in part or in whole by the server system 108 or, more specifically, by the map system 208 of the system 100 based on the location visitation information safeguard component 210. Accordingly, various methods are described herein by way of example with reference to the map system 208. At least some of the operations of the methods 400, 500, 600 may be deployed on various other hardware configurations, and the methods described herein are not intended to be limited to being operated by the map system 208. Though the steps of the methods described herein may be depicted and described in a certain order, the order in which the operations are performed may vary between embodiments. For example, an operation may be performed before, after, or concurrently with another operation. Additionally, the components described with respect to the methods are merely examples of components that may be used with the methods, and other components may also be utilized, in some embodiments.

Referring now to a method 400 of FIG. 4, at operation 402, the map system 208 receives, from a client device 102, a request for information regarding a physical location on a map, which may be displayed on the client device 102. The request is associated with a single user that is connected to a set of other users, such as a connected-users or friends of the single user. The physical location can represent a location on a graphical representation of a map displayed on the client device 102. For instance, the physical location can be selected by the single user via the client device 102. The map can present a graphical representation of the physical location. The request can be generated on the client device 102 and sent to the map system 208 in response to the single user's selection of the physical location on the map. The selection can indicate a request to display or view information about the physical location, such as a physical address, a phone number, a website, or user visitation information for the physical location.

In response to the request received at operation 402, at operation 404, the map system 208 determines an initial count of users, from the set of other users that comprises connected-users or friends of the single user, that have visited the physical location. The initial count of users can represent an actual or accurate count of those other users (e.g., connected-users or friends) that visited the physical location, before applying a noise value.

According to some embodiments, one or more of the other users can provide an allow list or a block list that indicates whether they wish to share their information regarding their visiting (e.g., check-in at) certain types of locations, or specific locations, with another user. For instance, to determine the initial count of users that have visited the physical location, the map system 208, for each individual user in the set of other users (e.g., in the single user's list of connected-user or friends) can determine whether the individual user visited the physical location. In response to determining that the individual user visited the physical location, the map system 208 can count the individual user as part of the initial count of users based on an allow list or block list) for the individual user. An allow list can indicate a preference of the individual user to share their location visitation information for at least one of a specific physical location or a location category. A block list can indicate a preference for the individual user not to share their location visitation information for at least one of a specific physical location or a location category.

In operation 406, the map system 208 samples a distribution to generate a negative value for the initial count of users. According to various embodiments, the negative value represents a noise value that can be applied to an actual count of users that has visited (e.g., checked-in to) the physical location. For instance, the map system 208 samples a noise value e from a Laplace distribution based on a factor s, where s can represent a value for scaling the noise value e. The value for scaling is a scale value can be used as a parameter (e.g., privacy parameter) for adjusting or fine tuning the noise value sampled from the distribution.

The map system 208, at operation 408, generates visitation count information for the physical location based on a safeguarded count of users, where the safeguarded count of users is generated based on the initial count of users and the negative value (generated by operation 406). For various embodiments, the visitation count information is configured to be provided to the client device 102 in response to the request received at operation 402. According to some embodiments, the safeguarded count of users is generated by adding the negative value generated in operation 406 to the initial count of users. The visitation count information can comprise the safeguarded count of users and can be provided to the client device 102 in response to the request received at operation 402.

Additionally, for some embodiments, generating the visitation count information based on the initial count of users and the negative value comprises generating the safeguarded count of users by adding the negative value to the initial count of users and, subsequently, determining a label (e.g., "3+ visitations," "5+ visitations," "10+ visitations," and the like; or "Highly Popular," "Mildly Popular," "Lightly Popular," and the like) for the safeguarded count of users. The label can describe a visitation count category associated with range count values, and the label is included in the visitation count information in place of the initial count or the safeguarded count of users. As described above, some example labels include "3+ visitations" or "highly popular." The visitation count information (e.g., which includes the safeguarded count of users or a label that replaces the safeguarded count) can be sent to the client device 102, which can present the single user with the visitation count information.

Referring now to a method 500 of FIG. 5, operations 502, 504, 506, 508 are respectively similar to operations 402 through 408 of the method 400.

Following operation 508, at operation 510, the map system 208 determines whether to provide the visitation count information (generated by operation 508) to the client device 102 based on a size of the set of other users (e.g., size of the single user's connected-users list or friend list) and based on a threshold value. For example, the map system 208 can determine to provide the visitation count information to the client device 102 if the size of the set of other users is greater than or equal to the threshold value. For some embodiments, the map system 208 generates the threshold value based on the initial count of users that have visited the physical location. For instance, the map system 208 can generate the threshold value by adding a predetermined factor k to the initial count of the physical location (e.g., <friend check-in count> to the physical location). As described above, the predetermined k (e.g., 2 or 3) can represent a parameter for tuning or randomizing the threshold value. Additionally or alternatively, for some embodiments, the map system 208 generates the threshold value based on a region associated with the physical location. For instance, the map system 208 can use different predetermined factors k for different geographic regions. For example, the map system 208 can use a first predetermined factor k1 for users in United States, and a second predetermined factor k2 for users in the United Kingdom.

At operation 512, the map system 208 provides the visitation count information to the client device 102 in response to determining (at 510) to provide the visitation count information to the client device 102. As described herein, the visitation count information (which can include the safeguarded count of users or a label that replaces the safeguarded count) can be sent to the client device 102, which can present the single user with the visitation count information.

Referring now to a method 600 of FIG. 6, operations 602, 604, 606, 608 are respectively similar to operations 402 through 408 of the method 400.

Following operation 608, at operation 610, the map system 208 generates a threshold value by adding a predetermined factor (e.g., k) to the initial count of users that have visited the physical location (as determined by operation 604). At operation 612, the map system 208 compares the threshold value (generated by operation 608) to a size of the set of other users connected to the single user. In response to the size being greater than or equal to the threshold value, at operation 614, the map system 208 provides the visitation count information to the client device. If the size is less than the threshold value, the visitation count information can refrain from providing the visitation count information to the client device.

Figure 7:
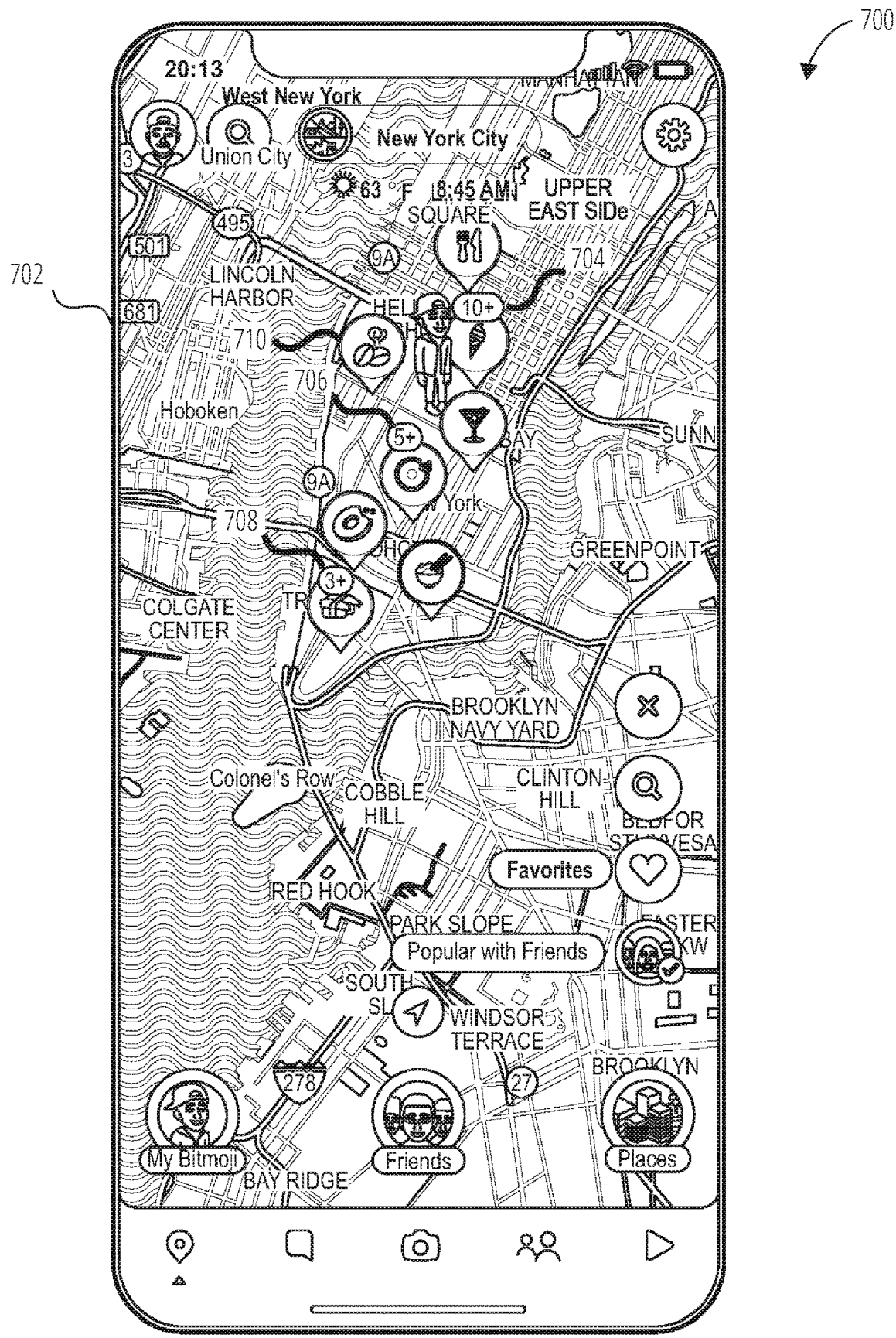
FIG. 7 illustrates an example client user interface that displays a map with location visitation information, in accordance with various embodiments.

FIG. 7 illustrates an example client user interface 702 that displays a map with location visitation information on a client device 102, in accordance with various embodiments. In particular, a mobile client device 700 displays the client user interface 702 for an active user, which presents a graphical representation of a map of a geographic region. The map includes several markers indicating the locations of places, highways, roads, cities, and other users on the map. Certain map markers, such as map marker 710, include an icon to represent a place or another user on the map. Additionally, certain markers, such as markers 704, 706, 708, that correspond to places include labels associated with categories of visitation counts that describe visitation count information for those places. As described above, some embodiments use a label (e.g., 3+, 5+, 10+, and the like) in place of an actual count of visitations (e.g., check-ins) by other users (e.g., friends) connected with the active user. For instance, marker 704 includes a label of "10+" (e.g., in place of an actual count of 12) to indicate that 10 or more connected-users (e.g., friends) of the active user visited the place (e.g., ice cream shop) corresponding to marker 704. Marker 706 includes a label of "5+" (e.g., in place of an actual count of 5) to indicate that 5 or more connected-users (e.g., friends) of the active user visited the place (e.g., pizza restaurant) corresponding to marker 706. Likewise, marker 708 includes a label of "3+" (e.g., in place of an actual count of 4) to indicate that 3 or more connected-users (e.g., friends) of the active user visited the place (e.g., sushi restaurant) corresponding to marker 708. According to some embodiments, the labels are used in place of an actual count of visits (e.g., check-ins) to add a level of obscurity or indistinguishability to the location visitation information displayed to the active user.

Figure 8:
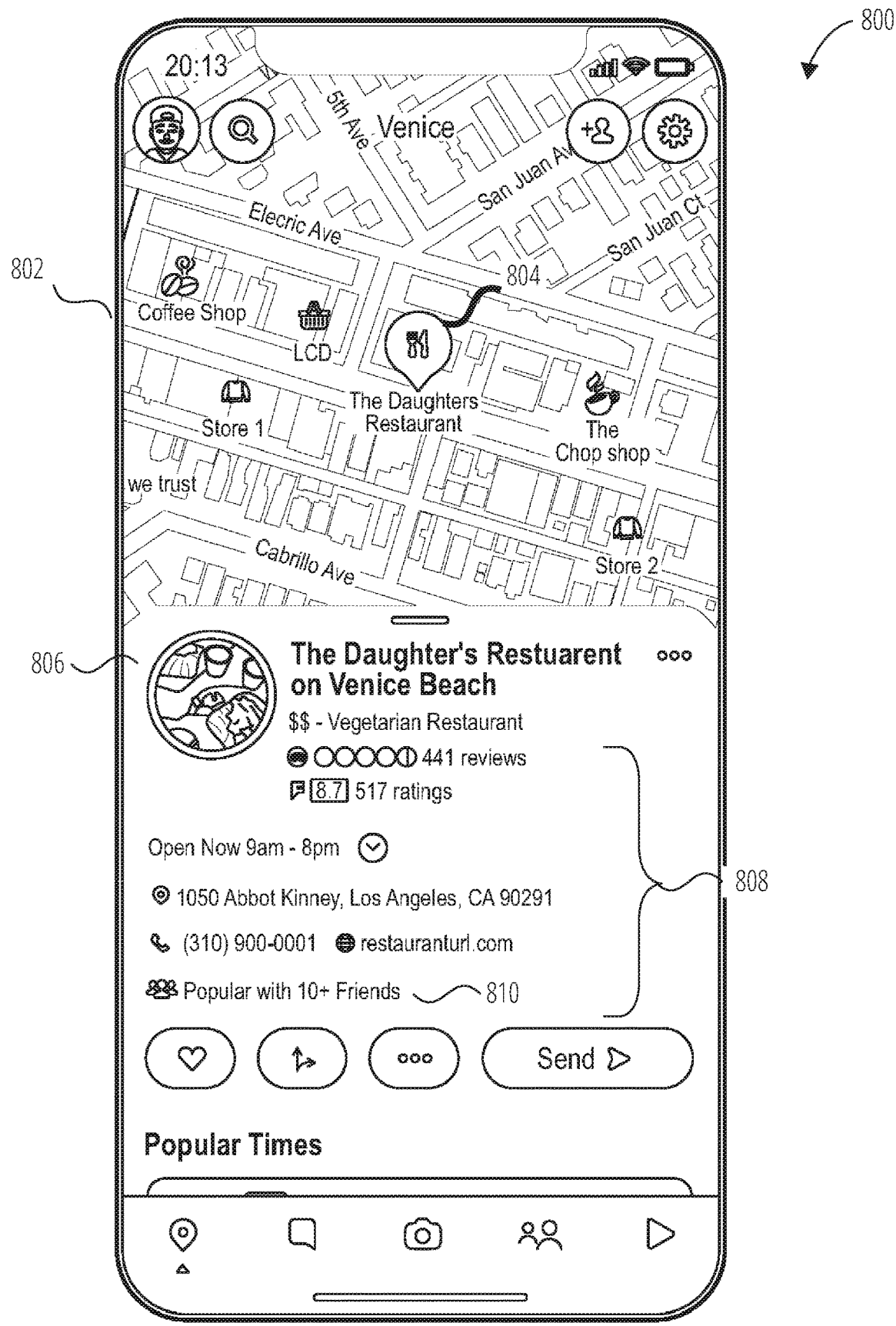
FIG. 8 illustrates an example client user interface that displays a map with location visitation information, in accordance with various embodiments.

FIG. 8 illustrates an example client user interface 802 that displays a map with location visitation information, in accordance with various embodiments. Similar to FIG. 7, a mobile client device 800 displays the client user interface 802 for an active user, which presents a graphical representation of a map of a geographic region. The map can include several markers indicating the locations of places, buildings, and roads on the map. Marker 804 corresponds to a restaurant (e.g., "The Daughter's Restaurant"), which when selected by the active user, causes presentation of a graphical card 806 to the active user. The graphical card provides information about the restaurant. For instance, the graphical card 806 provides location information 808 for the restaurant that describes the type of restaurant, a number of reviews of the restaurant, the hours of operation, physical address, phone number, and a website address. The location information 808 further includes visitation information for the restaurant and, more specifically, a label 810 ("Popular with 10+ Friends") associated with a count of the active user's friends that have visited (e.g., checked-in at) the restaurant. The label is used in place of an actual count of visits (e.g., check-ins) to add a level of obscurity or indistinguishability to the location visitation information displayed to the active user.

Figure 9:
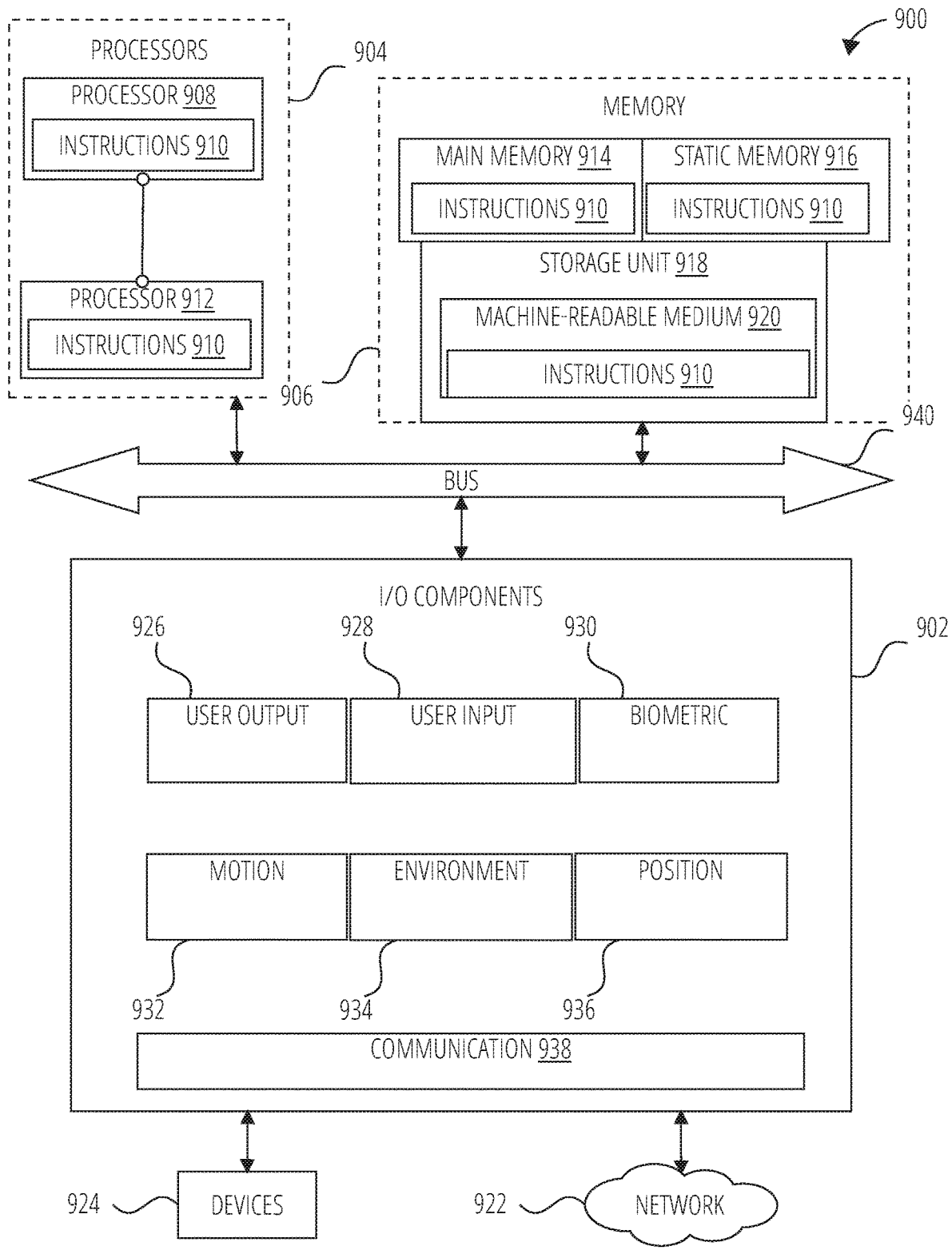
FIG. 9 is a diagrammatic representation of a machine in the form of a computer system within which a set of instructions may be executed for causing the machine to perform any one or more of the methodologies discussed herein, in accordance with various embodiments.

FIG. 9 is a diagrammatic representation of the machine 900 within which instructions 910 (e.g., software, a program, an application, an applet, an app, or other executable code) for causing the machine 900 to perform any one or more of the methodologies discussed herein may be executed, in accordance with various embodiments. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein. The machine 900, for example, may comprise the client device 102 or any one of a number of server devices forming part of the server system 108. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 902, which may be configured to communicate with each other via a bus 940. In an example, the processors 904 (e.g., a Central Processing Unit (CPU), a Reduced Instruction Set Computing (RISC)

Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, both accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the Processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include user output components 926 and user input components 928. The user output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

The environmental components 934 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 936 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 938 operable to couple the machine 900 to a network 922 or devices 924 via respective coupling or connections. For example, the communication components 938 may include a network interface Component or another suitable device to interface with the network 922. In further examples, the communication components 938 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

Figure 10:
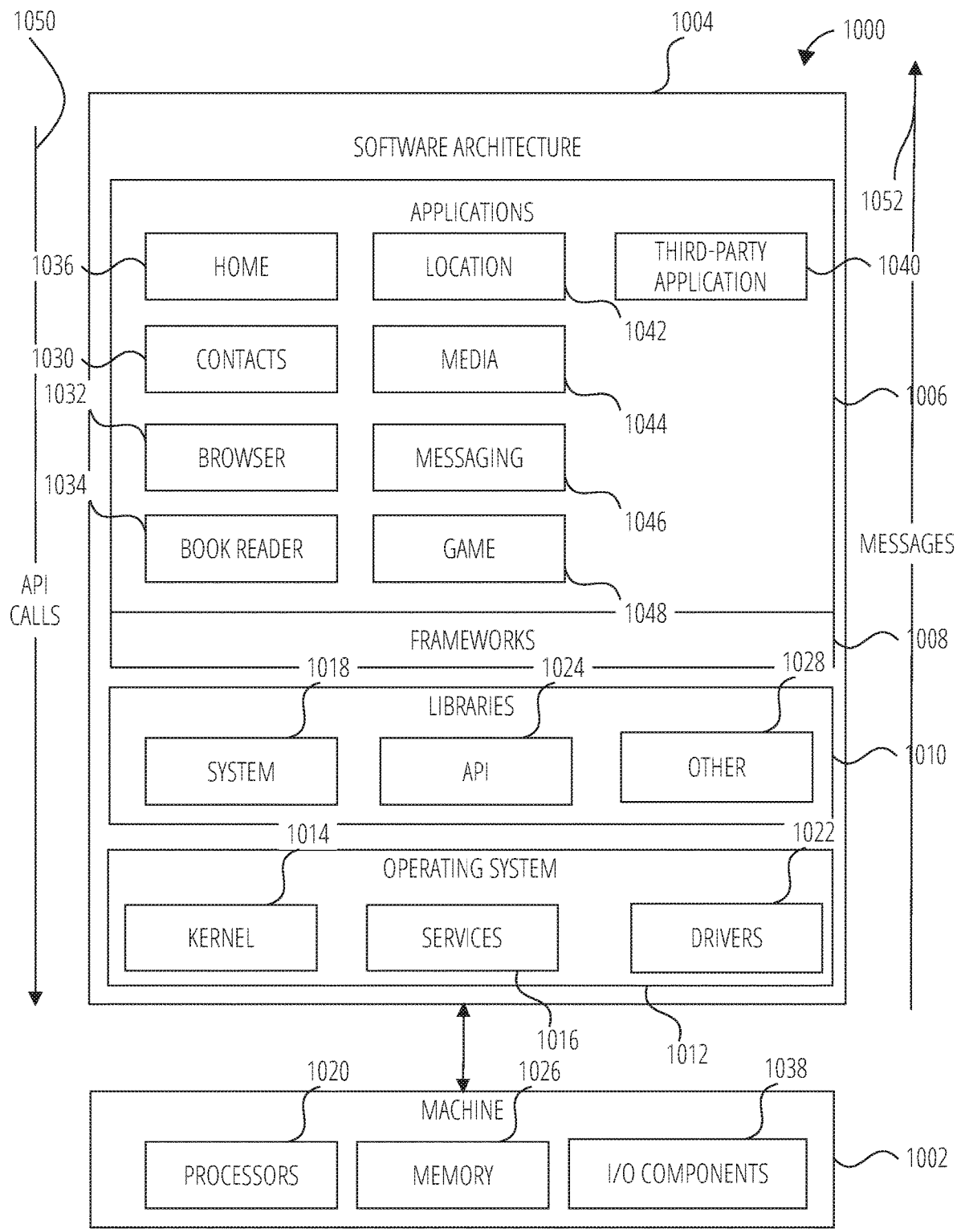
FIG. 10 is a block diagram showing a software architecture, which can be installed on any one or more of the devices described herein, and within which various embodiments may be implemented.

FIG. 10 is a block diagram 1000 showing a software architecture 1004, which can be installed on any one or more of the devices described herein, and within which various embodiments may be implemented. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1020 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   receiving, from a client device, a request for information regarding a physical location on a map, the request being associated with a single user that is connected to a set of other users; and
   in response to the request:
      determining, by a hardware processor, an initial count of users from the set of other users that have visited the physical location;
      sampling, by the hardware processor, a distribution to generate a negative value for the initial count of users;
      generating, by the hardware processor, visitation count information for the physical location based on a safeguarded count of users, the safeguarded count of users being generated based on the initial count of users and the negative value, the visitation count information being configured to be provided to the client device in response to the request;
      determining, by the hardware processor, whether to provide the visitation count information to the client device based on a size of the set of other users and based on a threshold value; and
      providing, by the hardware processor, the visitation count information to the client device in response to determining to provide the visitation count information to the client device.

2. The method of claim 1, wherein the distribution comprises a Laplace distribution.

3. The method of claim 1, wherein the determining of the initial count of users from the set of other users that have visited the physical location comprises:
   for each individual user in the set of other users:
      determining whether the individual user visited the physical location; and
      in response to determining that the individual user visited the physical location, counting the individual user as part of the initial count of users based on an allow list for the individual user, the allow list indicating a preference of the individual user to share with another user the individual user's location visitation information with respect to at least one of a specific physical location or a location category.

4. The method of claim 1, wherein the generating of the visitation count information for the physical location based on the initial count of users and the negative value comprising:
   generating the safeguarded count of users by adding the negative value to the initial count of users, the visitation count information comprising the safeguarded count of users.

5. The method of claim 1, wherein the generating of the visitation count information for the physical location based on the initial count of users and the negative value comprising:
   generating the safeguarded count of users by adding the negative value to the initial count of users; and
   determining a label for the safeguarded count of users, the label describing a visitation count category associated with a range count values, the visitation count information comprising the label.

6. The method of claim 1, comprising:
   in response to the request:
      providing, by the hardware processor, the visitation count information to the client device.

7. The method of claim 1, comprising:
   in response to the request:
      generating, by the hardware processor, the threshold value based on a region associated with the physical location.

8. The method of claim 1, comprising:
   in response to the request:
      generating, by the hardware processor, the threshold value based on the initial count of users that have visited the physical location.

9. The method of claim 1, comprising:
in response to the request:
generating, by the hardware processor, a threshold value by adding a predetermined factor to the initial count of users that have visited the physical location;
comparing, by the hardware processor, the threshold value to a size of the set of other users connected to the single user; and
in response to the size being greater than or equal to the threshold value, providing, by the hardware processor, the visitation count information to the client device.

10. A non-transitory computer-readable storage medium, the computer-readable storage medium including instructions that when executed by a hardware processor, cause the hardware processor to perform operations comprising:
receiving, from a client device, a request for information regarding a physical location on a map, the request being associated with a single user that is connected to a set of other users; and
in response to the request:
determining an initial count of users from the set of other users that have visited the physical location;
sampling a distribution to generate a negative value for the initial count of users;
generating visitation count information for the physical location based on a safeguarded count of users, the safeguarded count of users being generated based on the initial count of users and the negative value, the visitation count information being configured to be provided to the client device in response to the request;
determining whether to provide the visitation count information to the client device based on a size of the set of other users and based on a threshold value; and
providing the visitation count information to the client device in response to determining to provide the visitation count information to the client device.

11. The non-transitory computer-readable storage medium of claim 10, wherein the distribution comprises a Laplace distribution.

12. The non-transitory computer-readable storage medium of claim 10, wherein the determining of the initial count of users from the set of other users that have visited the physical location comprises:
for each individual user in the set of other users:
determining whether the individual user visited the physical location; and
in response to determining that the individual user visited the physical location, counting the individual user as part of the initial count of users based on an allow list for the individual user, the allow list indicating a preference of the individual user to share with another user the individual user's location visitation information with respect to at least one of a specific physical location or a location category.

13. The non-transitory computer-readable storage medium of claim 10, wherein the generating of the visitation count information for the physical location based on the initial count of users and the negative value comprising:
generating the safeguarded count of users by adding the negative value to the initial count of users, the visitation count information comprising the safeguarded count of users.

14. The non-transitory computer-readable storage medium of claim 10, wherein the generating of the visitation count information for the physical location based on the initial count of users and the negative value comprising:
generating the safeguarded count of users by adding the negative value to the initial count of users; and
determine a label for the safeguarded count of users, the label describing a visitation count category associated with a range count values, the visitation count information comprising the label.

15. The non-transitory computer-readable storage medium of claim 10, wherein the operations comprise:
in response to the request:
providing the visitation count information to the client device.

16. The non-transitory computer-readable storage medium of claim 10, wherein the operations comprise:
in response to the request:
generating a threshold value by adding a predetermined factor to the initial count of users that have visited the physical location;
comparing the threshold value to a size of the set of other users connected to the single user; and
in response to the size being greater than or equal to the threshold value, providing the visitation count information to the client device.

17. The non-transitory computer-readable storage medium of claim 16, wherein the operations comprise:
in response to the request:
generating the threshold value based on a region associated with the physical location.

18. A system comprising:
a hardware processor; and
a memory storing instructions that, when executed by the hardware processor, causes the hardware processor to perform operations comprising:
receiving, from a client device, a request for information regarding a physical location on a map, the request being associated with a single user that is connected to a set of other users; and
in response to the request:
determining an initial count of users from the set of other users that have visited the physical location;
sampling a distribution to generate a negative value for the initial count of users;
generating visitation count information for the physical location based on a safeguarded count of users, the safeguarded count of users being generated based on the initial count of users and the negative value, the visitation count information being configured to be provided to the client device in response to the request;
determining whether to provide the visitation count information to the client device based on a size of the set of other users and based on a threshold value; and
providing the visitation count information to the client device in response to determining to provide the visitation count information to the client device.

19. The system of claim 18, wherein the operations comprise:
in response to the request:
generating a threshold value by adding a predetermined factor to the initial count of users that have visited the physical location;
comparing the threshold value to a size of the set of other users connected to the single user; and in response to the size being greater than or equal to the threshold value, providing the visitation count information to the client device.

20. The system of claim 18, wherein the operations comprise:
in response to the request:
generating the threshold value based on a region associated with the physical location.

\* \* \* \* \*